(12) United States Patent
Rommel

(10) Patent No.: US 6,443,580 B2
(45) Date of Patent: Sep. 3, 2002

(54) EXTERIOR REARVIEW MIRROR HAVING SENDING UNIT FOR GARAGE DOOR OPENER

(75) Inventor: Bernd Rommel, Fellbach-Schmiden (DE)

(73) Assignee: Reitter & Schefnacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/780,048

(22) Filed: Feb. 9, 2001

(30) Foreign Application Priority Data

Feb. 10, 2000 (DE) ..................... 200 02 386 U

(51) Int. Cl.⁷ ................................. G02B 5/08
(52) U.S. Cl. ................. 359/838; 359/871; 340/825.72; 341/176
(58) Field of Search ................. 359/838, 839, 359/844, 871, 872, 877; 340/825, 825.72; 341/176

(56) References Cited

U.S. PATENT DOCUMENTS 4,447,808 A  *  5/1984  Marcus ....................... 341/176
5,680,263 A  * 10/1997  Zimmermann et al. ..... 359/872
6,019,475 A  *  2/2000  Lynam et al. ............... 359/879

* cited by examiner

Primary Examiner—Mark A. Robinson
(74) Attorney, Agent, or Firm—Gudrun E. Huckett

(57) ABSTRACT

An exterior rearview mirror for a motor vehicle has a mirror head having a housing and a support arranged in the housing. The housing has an opening and a cover for closing the opening. The cover has at least one sending unit for a garage door opener. The cover is detachably connected to the support.

25 Claims, 6 Drawing Sheets

EXTERIOR REARVIEW MIRROR HAVING SENDING UNIT FOR GARAGE DOOR OPENER

BACKGROUND OF THE INVENTION

1. Field of the Invention

The invention relates to an exterior rearview mirror comprising a mirror head with a housing and a support arranged in the housing.

2. Description of the Related Art

Garage door openers are known which are used for opening garage doors by remote control. Their sending units are usually loosely transported within the motor vehicle and cooperate with a corresponding receiver mounted in the garage. These sending units have the disadvantage that they are often misplaced within the vehicle so that the driver often cannot find the sending unit quickly enough for opening or closing the garage door.

SUMMARY OF THE INVENTION

It is an object of the present invention to provide an exterior rearview mirror of the aforementioned kind so that it is suitable for storing the sending unit of a garage door opener.

In accordance with the present invention, this is achieved in that the housing of the mirror head has an opening which can be closed by a cover provided with at least one sending unit for a garage door opener.

As a result of the configuration according to the invention, the sending unit of the garage door opener is arranged on the cover so that it is fixedly mounted within the exterior rearview mirror. Accordingly, a mounting space for the sending unit within the motor vehicle is not required. Since the cover is provided with the sending unit, a simple mounting of the sending unit is ensured. It can also be easily dismounted by removing the cover.

DESCRIPTION OF THE PREFERRED EMBODIMENTS

Figure 1:
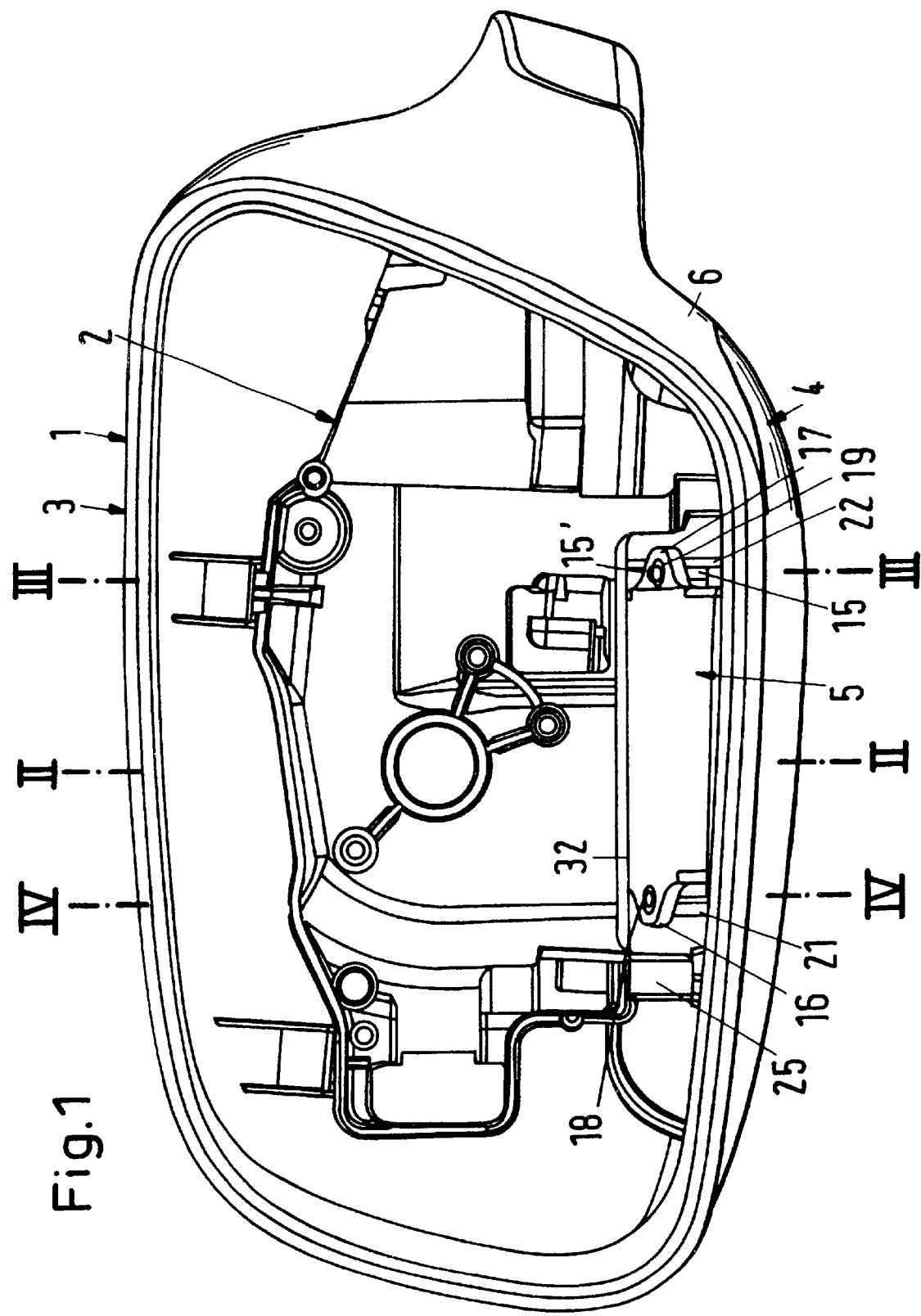
FIG. 1 is a perspective illustration of a mirror head of the exterior review mirror according to the invention with a cover that is secured in the housing of the mirror head.

The mirror head 1 of an exterior rearview mirror illustrated in FIGS. 1 to 6 comprises a sending unit 5 for actuating a garage door opener. The mirror head 1 has a support 2 for a mirror glass holder (not illustrated) and a housing 3 on which a cover 4 is secured. The mirror head 1 is connected to a mirror base (not illustrated) so as to be foldable in a manner known in the art, and the exterior rearview mirror is connected by means of the mirror base to the motor vehicle. The constructive embodiment of the mirror head 1 is known in the art and is therefore not explained in detail in this context.

The sending unit 5 of the garage door opener (not shown) is arranged on the inner side 27 of the cover 4.

Figure 2:
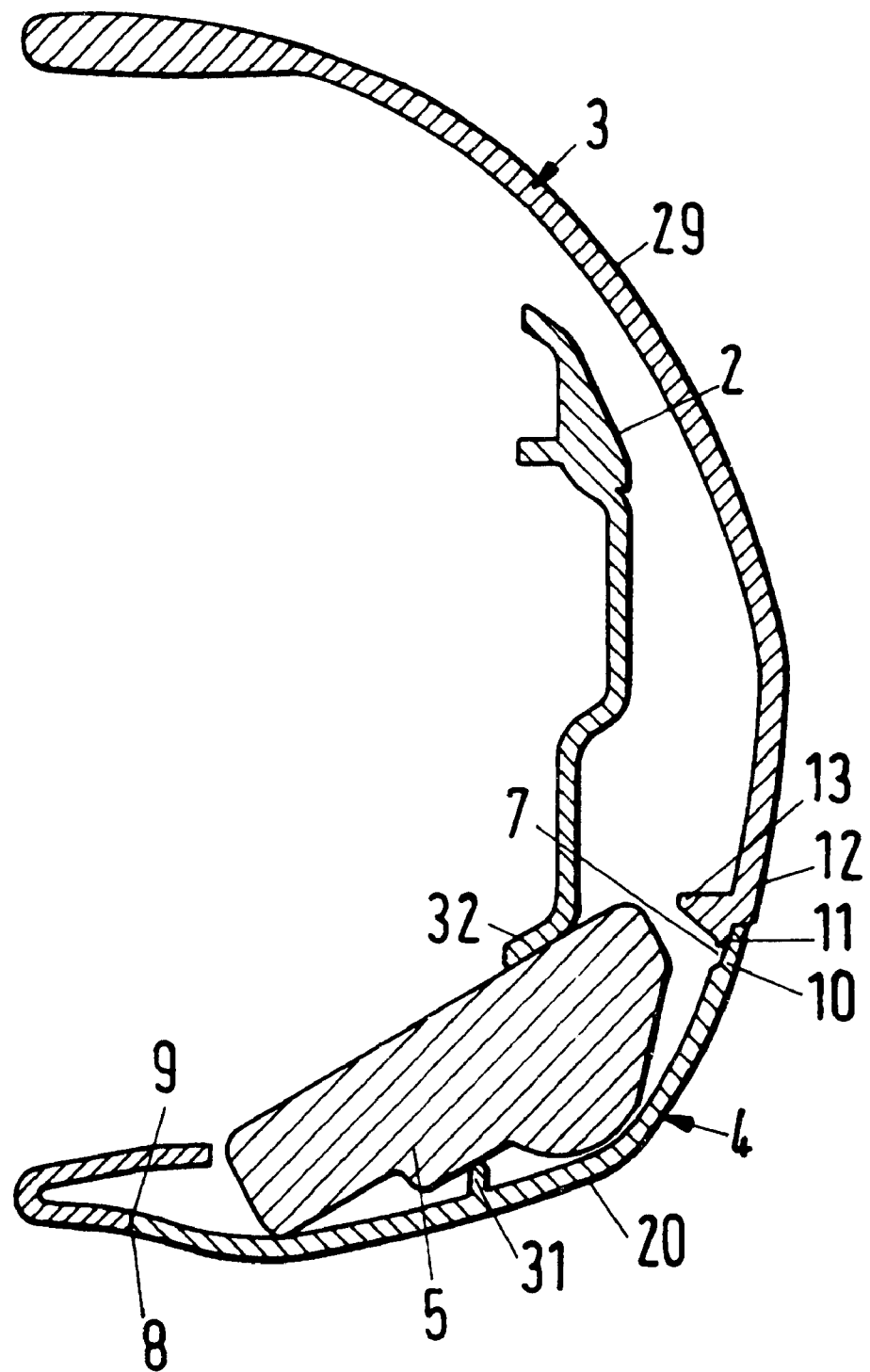
FIG. 2 is a section view along the line II—II of FIG. 1.
Figure 4:
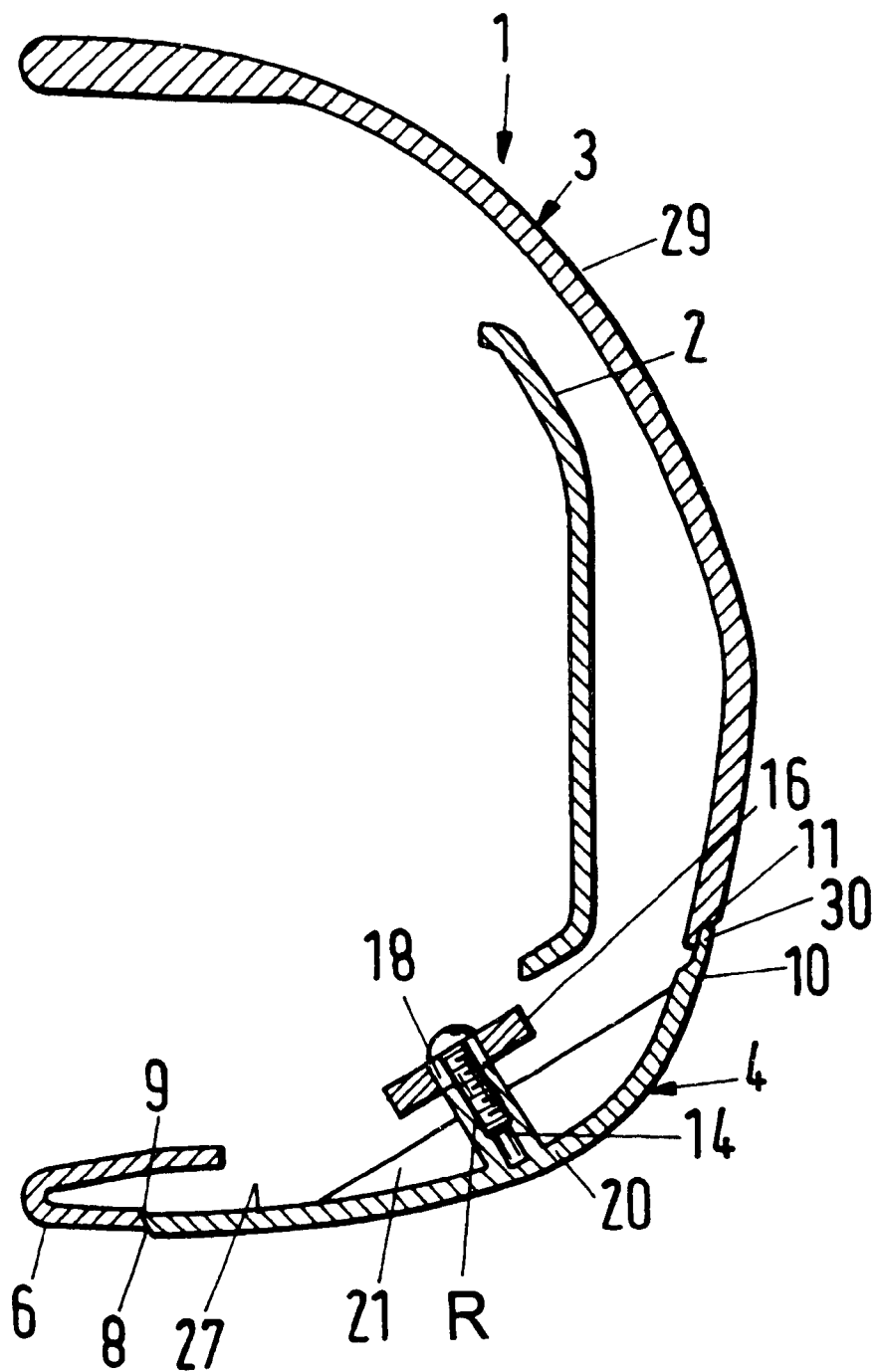
FIG. 4 is a section view along the line IV—IV of FIG. 1.
Figure 5:
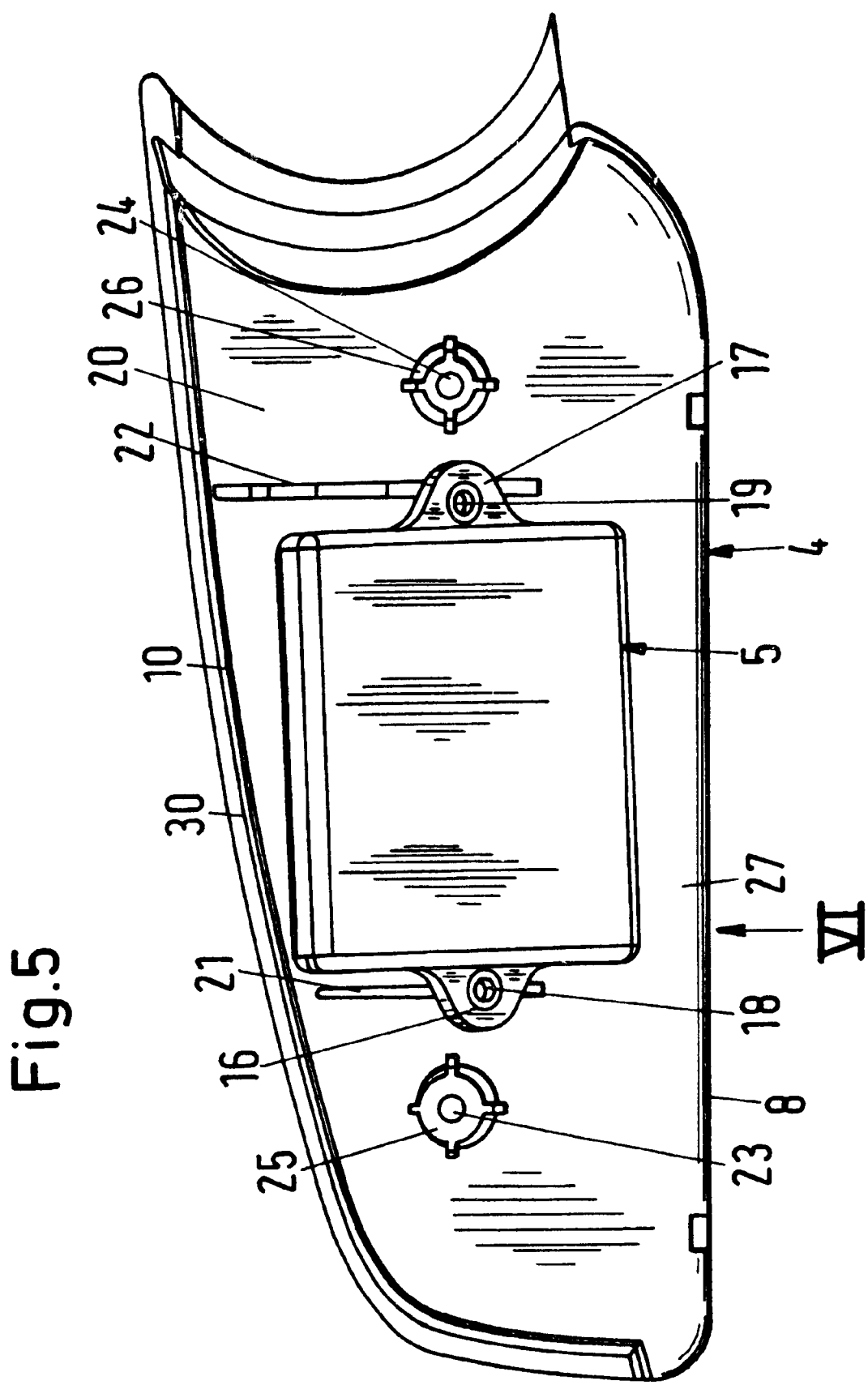
FIG. 5 shows the cover in a view according to arrow V of FIG. 6.

The cover 4 is secured on the underside 6 of the housing 3 in a housing opening 7 (FIGS. 1 through 4) and has a substantially rectangular contour, as illustrated in FIG. 5. The cover 4 extends approximately over the entire length of the underside 6 of the housing 3. The shape of the cover 4 is matched to the housing 3 such that it forms a continuous extension of the adjacent portions of the housing. With its forward longitudinal rim 8 (FIG. 3) the cover 4 abuts a longitudinal rim 9 of the opening 7 which is provided at the underside 6 of the housing 3 in the vicinity of the opening 28 of the housing 3 for the mirror glass. The other longitudinal rim 10 of the cover 4 is positioned at the front side 29 of the housing 3 facing in the travel direction F and is of a tapering configuration. Accordingly, this longitudinal rim 10 has a rim portion 30 which has a reduced thickness and overlaps a rim portion 11 of the rim 12 of the opening 7 also having a reduced thickness. As illustrated in FIG. 2, the front side 29 of the housing 3 is provided at its inner side with a reinforcement 13 approximately at half the length of the rim 12 of the opening 7. This reinforcement 13 has a triangular cross-section in the illustrated embodiment. The reinforcement 13 tapers in a direction toward the interior of the housing 3.

Figure 6:
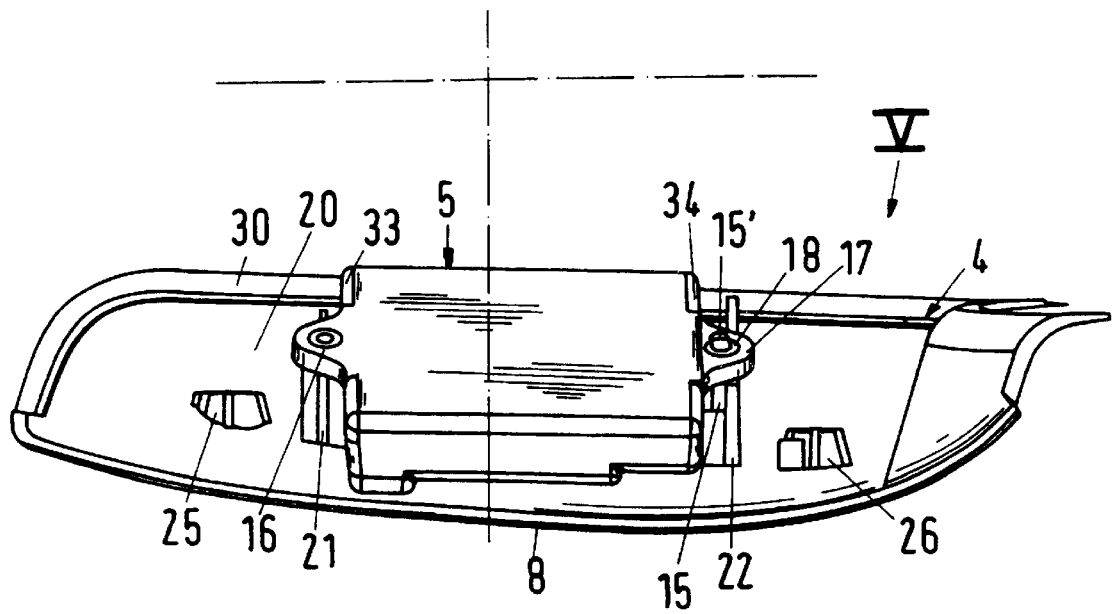
FIG. 6 shows the cover in a view according to arrow VI of FIG. 5.

At the inner side 27 of the cover 4 (FIG. 4) the sending unit 5 formed as a module is secured by securing parts 14 and 15. The securing part 14 is a screw (FIG. 4) which is screwed into a receiving member R which projects from the inner side 27 of the cover 4 and is preferably a monolithic part thereof (FIG. 4). The securing part 15 (FIG. 3) is a narrow stay projecting at a slant from the inner side 27 of the cover 4 and preferably formed as a monolithic part thereof. It is provided at its free end with a hook 15'. The housing of the sending unit 5 has connector parts in the form of projecting tabs 16, 17 at two opposite sides 33, 34. The tabs 16, 17 are provided with an opening 18, 19, respectively. The screw 14 projects through the opening 18 and the stay 15 projects through the opening 19. The hook-shaped end 15' of the stay 15 engages the tab 17 (FIGS. 1, 3 and 6).

Figure 3:
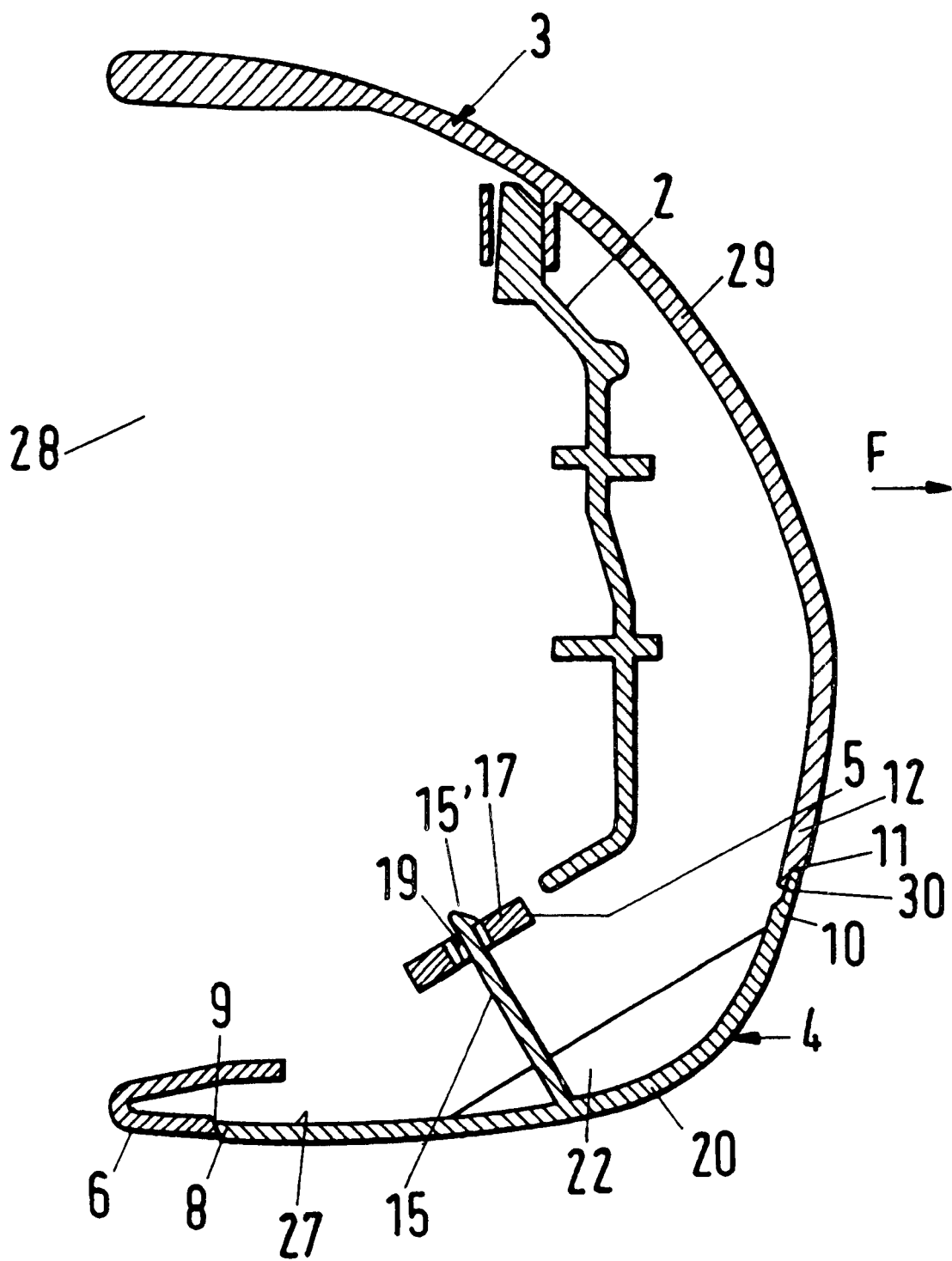
FIG. 3 is a section view along the line III—III of FIG. 1.

The cover 4 extends, as illustrated in FIGS. 2 to 4, from the underside 6 of the housing 3 in an arc shape into the front side 29 of the housing 3. The cover 4 is reinforced at its inner side in the transition area 20 with two ribs 21, 22 which are positioned at a spacing from one another and extend transversely to the longitudinal direction of the cover (FIGS. 1, 5 and 6). In a side view (FIGS. 3 and 4) the ribs 21, 22 are approximately triangular in shape. They are advantageously a monolithic part of the cover 4. The sending unit 5 is positioned between the two ribs 21, 22 at the inner side of the cover 4. The stay-shaped ribs 21, 22 are parallel to one another.

The cover 4 is fastened on the support 2. It can be snapped into place on the support 2 so that a simple and fast assembly is possible. It is also possible to connect the cover 4 on the support 2 by screwing. In this case, two securing parts in the form of fastening projections 25, 26 are provided. They project from the inner side 27 of the cover 4 on opposite sides of the ribs 21, 22 or the sending unit 5, respectively. They are preferably monolithic parts of the cover 4 (FIGS. 5 and 6). Screws (not illustrated) for detachably connecting the cover 4 on the support 2 are screwed into the central openings 23, 24 of the fastening projections 25, 26.

In the area between the ribs 21, 22 a flat rib 31 projects from the inner side 27 of the cover 4 (FIG. 2) on which the sending unit 5 is supported. The support 2 is moreover embodied such that it rests with an angled portion 32 (FIGS. 1 and 2) on the sending unit 5 and secures it additionally in its mounted position.

As a result of the secure attachment of the cover 4 on the mirror housing 3, the sending unit 5 is also reliably fastened. It can be actuated via an electrical connection by means of an actuator part (not illustrated) such as a switch, a button or the like which is provided in the interior of the vehicle. When the driver with his vehicle reaches the vicinity of the garage door, he can simply activate with the actuator part the sending unit 5 which sends a signal to the receiver of the garage door opener. Accordingly, the garage door is opened or closed by remote control. The cover 4 is comprised of a material which is transparent for the radiation emitted by the sending unit 5.

While specific embodiments of the invention have been shown and described in detail to illustrate the inventive principles, it will be understood that the invention may be embodied otherwise without departing from such principles.

What is claimed is:

1. An exterior rearview mirror for a motor vehicle, the exterior rearview mirror comprising:

a mirror head (1) comprising a housing (3) and a support (2) arranged in said housing (3);

said housing (3) having an opening (7) and a cover (4) configured to close said opening (7);

said cover (4) comprising at least one sending unit (5) of a garage door opener;

wherein said cover (4) is connected to said support (2);

wherein said cover (4) has at least one first securing part (25, 26) configured to receive a fastener;

wherein said cover (4) has at least one second securing part (14, 15) configured to fasten said sending unit (5);

wherein two of said second securing parts (14, 15) are positioned at a spacing from one another in a longitudinal direction of said cover (4);

wherein two of said first securing parts (25, 26) are positioned at a spacing from one another in a longitudinal direction of said cover (4), wherein said second securing parts (14, 15) are positioned at approximately identical spacing between said first securing parts (25, 26).

2. The exterior rearview mirror according to claim 1, wherein said cover (4) is detachably connected to said support (2).

3. The exterior rearview mirror according to claim 2, wherein said cover (4) and said support (2) are connected by a snap connection.

4. The exterior rearview mirror according to claim 2, wherein said cover (4) and said support (2) are connected by a screw connection.

5. The exterior rearview mirror according to claim 1, wherein said at least one first securing part (25, 26) is connected to said inner side of said cover (4).

6. The exterior rearview mirror according to claim 5, wherein said at least one first securing part (25, 26) is connected to said inner side of said cover (4).

7. The exterior rearview mirror according to claim 1, wherein said cover (4) has an inner side and a receiving member (R) arranged on said inner side, wherein a first one of said second securing parts (14) is a screw configured to be screwed into said receiving member (R).

8. The exterior rearview mirror according to claim 7, wherein said sending unit (5) has a connector part (16), wherein a second one of said second securing parts (15) is a hook having a hook end (15') configured to engage said connector part (16).

9. The exterior rearview mirror according to claim 8, wherein said hook (15) is connected to said inner side of said cover (4).

10. The exterior rearview mirror according to claim 9, wherein said hook (15) is a monolithic part of said cover (4).

11. The exterior rearview mirror according to claim 1, wherein said sending unit (5) has laterally projecting connector parts (16, 17).

12. The exterior rearview mirror according to claim 11, wherein said connector parts (16, 17) have openings (18, 19) configured to receive said second securing parts (14, 15), respectively.

13. The exterior rearview mirror according to claim 1, wherein said cover (4) is fastened to said support (2) with said at least one first securing part (25, 26).

14. The exterior rearview mirror according to claim 1, wherein said cover (4) has an exterior side forming a continuous contour portion of an outer contour of said housing (6).

15. The exterior rearview mirror according to claim 1, wherein said cover (4) is comprised of a material transparent for radiation emitted by said sending unit (5).

16. An exterior rearview mirror for a motor vehicle, the exterior rearview mirror comprising:

a mirror head (1) comprising a housing (3) and a support (2) arranged in said housing (3);

said housing (3) having an opening (7) and a cover (4) configured to close said opening (7);

said cover (4) comprising at least one sending unit (5) of a garage door opener;

wherein said cover (4) is detachably connected to said support (2) by a screw connection;

wherein said cover (4) has at least one first securing part (25, 26) configured to receive a fastener;

wherein said cover (4) has at least one second securing part (14, 15) configured to fasten said sending unit (5); and wherein said cover (4) has an inner side and reinforcement ribs (21, 22) connected to said inner side, wherein said sending unit (5) is positioned between said reinforcement ribs (21, 22).

17. The exterior rearview mirror according to claim 16, wherein said reinforcement ribs (21, 22) extend transversely to a longitudinal direction of said cover (4).

18. The exterior rearview mirror according to claim 17, wherein said housing (3) has an underside and a wall portion (29) facing in a direction of travel of the motor vehicle, wherein said cover (4) extends from said underside (6) to said wall portion (29) and has a first cover portion connected to said underside (6) and a second cover portion connected to said wall portion (29).

19. The exterior rearview mirror according to claim 18, wherein said cover (4) has a transition portion (20) arranged between said first and second cover portions, wherein said reinforcement ribs (21, 22) are located in said transition portion (20).

20. The exterior rearview mirror according to claim 16, wherein said cover (4) has an inner side and a receiving member (R) arranged on said inner side, wherein a first one of said second securing parts (14) is a screw configured to be screwed into said receiving member (R).

21. The exterior rearview mirror according to claim 20, wherein said sending unit (5) has a connector part (16), wherein a second one of said second securing parts (15) is a hook having a hook end (15') configured to engage said connector part (16).

22. The exterior rearview mirror according to claim 16, wherein said sending unit (5) has laterally projecting connector parts (16, 17) with openings (18, 19) configured to receive said second securing parts (14, 15), respectively.

23. The exterior rearview mirror according to claim 16, wherein said cover (4) is fastened to said support (2) with said at least one first securing part (25, 26).

24. The exterior rearview mirror according to claim 16, wherein said cover (4) has an exterior side forming a continuous contour portion of an outer contour of said housing (6).

25. The exterior rearview mirror according to claim 16, wherein said cover (4) is comprised of a material transparent for radiation emitted by said sending unit (5).

* * * * *